US00RE41283E

(19) United States
(12) Reissued Patent
Evans et al.

(10) Patent Number: US RE41,283 E
(45) Date of Reissued Patent: Apr. 27, 2010

(54) POWER CONNECTOR WITH SAFETY FEATURE

(75) Inventors: Robert F. Evans, Bedford, NH (US); Jeffrey W. Allison, Etters, PA (US); Brian M. Rohrbaugh, Glen Rock, PA (US)

(73) Assignee: FCI Americas Technology, Inc., Carson City, NV (US)

(21) Appl. No.: 11/862,464

(22) Filed: Sep. 27, 2007

Related U.S. Patent Documents

Reissue of:
(64) Patent No.: 7,037,142
Issued: May 2, 2006
Appl. No.: 11/227,666
Filed: Sep. 15, 2005

U.S. Applications:
(63) Continuation of application No. 10/352,531, filed on Jan. 28, 2003, now abandoned.

(51) Int. Cl.
*H01R 13/64* (2006.01)

(52) U.S. Cl. ..... 439/680; 439/79; 439/633
(58) Field of Classification Search ..... 439/680, 439/681, 682, 677, 633, 79
See application file for complete search history.

(56) References Cited

U.S. PATENT DOCUMENTS 2,430,011 A 11/1947 Gillentine ..... 173/361

(Continued)

FOREIGN PATENT DOCUMENTS

| | | | |
|---|---|---|---|
| DE | 23 50 834 | | 4/1975 |
| DE | 34 41 416 | A1 | 5/1986 |
| DE | 40 01 104 | A1 | 7/1991 |
| EP | 0 465 013 | | 1/1992 |
| EP | 0 724 313 | | 7/1996 |
| EP | 0 951 102 | A2 | 10/1999 |
| EP | 1091449 | | 9/2004 |
| FR | 2 699 744 | | 6/1994 |
| GB | 2 168 550 | | 6/1986 |
| JP | 05344728 | | 12/1993 |
| JP | 06068943 | | 3/1994 |
| JP | 07169523 | | 7/1995 |
| JP | 08096918 | | 4/1996 |
| JP | 09 055 245 | | 2/1997 |
| JP | 09199215 | | 7/1997 |
| JP | 13135388 | | 5/2001 |
| JP | 2003217785 | | 7/2003 |
| KR | 100517561 | B1 | 9/2005 |
| WO | WO 200016445 | | 3/2000 |
| WO | WO 2002103847 | | 12/2002 |
| WO | WO 2005065254 | | 7/2005 |
| WO | WO 2007064632 | | 6/2007 |

OTHER PUBLICATIONS

U.S. Appl. No. 12/317,366, filed Dec. 22, 2008, Minich.
Metral 1000 Series, PCB Mounted Receptacle Assembly, FCI Web Site page, 2001, 1 p.

(Continued)

*Primary Examiner*—Briggitte R Hammond
(74) *Attorney, Agent, or Firm*—Woodcock Washburn LLP

(57) ABSTRACT

Electrical receptacle connectors are provided including an insulative housing and AC power contacts disposed therein that are configured for engaging an external power supply. The receptacle connectors are employed with a safety guard for restricting operator access to hot AC power contacts when disconnected from complementary header connectors. Preferred safety guards include projections extending along at least a portion of perimeter areas surrounding housing apertures that provide access to engaging portions of the AC power contacts. The projections define a safety gap between human digits directed toward the housing apertures and the AC power contacts.

7 Claims, 5 Drawing Sheets

U.S. PATENT DOCUMENTS

| | | | | |
|---|---|---|---|---|
| 3,208,030 | A | 9/1965 | Evans et al. | |
| 3,286,220 | A | 11/1966 | Marley et al. | 439/680 |
| 3,497,850 | A | 2/1970 | Gallo, Sr. | 337/197 |
| 3,538,486 | A | 11/1970 | Shlesinger, Jr. | 439/268 |
| 3,596,235 | A | 7/1971 | Teurlings | 439/907 |
| 3,669,054 | A | 6/1972 | Desso et al. | 113/119 |
| 3,748,633 | A | 7/1973 | Lundergan | 339/217 |
| 3,750,092 | A | 7/1973 | Bury | 339/192 RL |
| 3,789,348 | A | 1/1974 | Lenaerts et al. | 339/198 R |
| 3,871,015 | A | 3/1975 | Lin et al. | 357/67 |
| 3,910,671 | A | 10/1975 | Townsend | 339/97 R |
| 3,942,856 | A | 3/1976 | Mindheim et al. | 339/74 |
| 3,944,312 | A | 3/1976 | Koenig | 339/59 R |
| 4,005,923 | A | 2/1977 | Davis, Jr. | 339/157 |
| 4,073,564 | A | 2/1978 | Davis, Jr. | 339/157 |
| 4,076,362 | A | 2/1978 | Ichimura | 339/75 |
| 4,082,407 | A | 4/1978 | Smorzaniuk et al. | |
| 4,136,919 | A | 1/1979 | Howard et al. | 339/75 |
| 4,159,861 | A | 7/1979 | Anhalt | 339/75 |
| 4,224,486 | A | 9/1980 | Zimmerman, Jr. et al. | 200/51.1 |
| 4,227,762 | A | 10/1980 | Scheiner | 339/91 R |
| 4,260,212 | A | 4/1981 | Ritchie et al. | 339/97 |
| 4,288,139 | A | 9/1981 | Cobaugh et al. | 339/74 |
| 4,322,120 | A | 3/1982 | Rilling | 439/907 |
| 4,371,912 | A | 2/1983 | Guzik | 361/417 |
| 4,383,724 | A | 5/1983 | Verhoeven | 439/510 |
| 4,402,563 | A | 9/1983 | Sinclair | 339/75 |
| 4,473,113 | A | 9/1984 | Whitfield et al. | |
| 4,500,160 | A | 2/1985 | Bertsch | 339/166 |
| 4,505,529 | A | 3/1985 | Barkus | 339/17 |
| 4,533,187 | A | 8/1985 | Kirkman | |
| 4,536,955 | A | 8/1985 | Gudgeon | 29/840 |
| 4,545,610 | A | 10/1985 | Lakritz et al. | 29/589 |
| 4,560,222 | A | 12/1985 | Dambach | 339/75 |
| 4,626,637 | A | 12/1986 | Olsson et al. | 200/284 |
| 4,659,158 | A | 4/1987 | Sakamoto et al. | 339/19 |
| 4,669,801 | A | 6/1987 | Worth | 439/404 |
| 4,685,886 | A | 8/1987 | Denlinger et al. | 439/55 |
| 4,709,976 | A | 12/1987 | Nakama et al. | 439/350 |
| 4,717,360 | A | 1/1988 | Czaja | 439/710 |
| 4,767,344 | A | 8/1988 | Noschese | 439/83 |
| 4,776,803 | A | 10/1988 | Pretchel et al. | 439/59 |
| 4,780,088 | A | 10/1988 | Means | 439/107 |
| 4,782,893 | A | 11/1988 | Thomas | |
| 4,790,763 | A | 12/1988 | Weber et al. | |
| 4,790,764 | A | 12/1988 | Kawaguchi et al. | 439/78 |
| 4,801,271 | A | 1/1989 | Piper | 439/148 |
| 4,815,987 | A | 3/1989 | Kawano et al. | 439/263 |
| 4,818,237 | A | 4/1989 | Weber | |
| 4,820,169 | A | 4/1989 | Weber et al. | |
| 4,820,175 | A | 4/1989 | Hasegawa et al. | 439/98 |
| 4,838,809 | A | 6/1989 | Mouissie | 439/155 |
| 4,845,592 | A | 7/1989 | Himes, Jr. et al. | 361/407 |
| 4,867,713 | A | 9/1989 | Ozu et al. | 439/833 |
| 4,875,865 | A | 10/1989 | Demler, Jr. et al. | 439/101 |
| 4,878,611 | A | 11/1989 | LoVasco et al. | 228/180.2 |
| 4,881,905 | A | 11/1989 | Demler, Jr. et al. | 439/79 |
| 4,900,271 | A | 2/1990 | Colleran et al. | 439/595 |
| 4,907,990 | A | 3/1990 | Bertho et al. | 439/851 |
| 4,915,641 | A | 4/1990 | Miskin et al. | |
| 4,917,625 | A | 4/1990 | Haile | 439/358 |
| 4,941,830 | A | 7/1990 | Tkazyik et al. | 439/59 |
| 4,950,186 | A | 8/1990 | Kaley et al. | 439/882 |
| 4,954,090 | A | 9/1990 | Shimochi | 439/76 |
| 4,963,102 | A | 10/1990 | Gettig et al. | 439/291 |
| 4,965,699 | A | 10/1990 | Jorden et al. | |
| 4,968,263 | A | 11/1990 | Silbernagel et al. | 439/246 |
| 4,973,271 | A | 11/1990 | Ishizuka et al. | 439/839 |
| 4,974,119 | A | 11/1990 | Martin | |
| 4,975,084 | A | 12/1990 | Fedder et al. | |
| 4,979,074 | A | 12/1990 | Morley | |
| 4,990,099 | A | 2/1991 | Marin et al. | 439/284 |
| 5,016,968 | A | 5/1991 | Hammond et al. | |
| 5,024,610 | A | 6/1991 | French et al. | 439/857 |
| 5,046,960 | A | 9/1991 | Fedder et al. | |
| 5,052,953 | A | 10/1991 | Weber | 439/857 |
| 5,066,236 | A | 11/1991 | Broeksteeg | 439/79 |
| 5,077,893 | A | 1/1992 | Mosquera et al. | 29/882 |
| 5,082,459 | A | 1/1992 | Billman et al. | 439/637 |
| 5,094,634 | A | 3/1992 | Dixon et al. | 431/751 |
| 5,107,328 | A | 4/1992 | Kinsman | 357/74 |
| 5,108,301 | A | 4/1992 | Torok | 439/263 |
| 5,137,959 | A | 8/1992 | Block et al. | |
| 5,139,426 | A | 8/1992 | Barkus et al. | |
| 5,151,056 | A | 9/1992 | McClune | |
| 5,152,700 | A | 10/1992 | Bogursky et al. | |
| 5,158,471 | A | 10/1992 | Fedder et al. | 439/80 |
| 5,173,063 | A | 12/1992 | Barkus et al. | 439/681 |
| 5,174,770 | A | 12/1992 | Sasaki et al. | 439/108 |
| 5,194,480 | A | 3/1993 | Block et al. | |
| 5,207,591 | A | 5/1993 | Ozaki et al. | 439/212 |
| 5,213,868 | A | 5/1993 | Liberty et al. | |
| 5,214,308 | A | 5/1993 | Nishiguchi et al. | |
| 5,238,414 | A | 8/1993 | Yaegashi et al. | 439/108 |
| 5,238,416 | A | 8/1993 | Dickie | 439/148 |
| 5,254,012 | A | 10/1993 | Wang | 439/263 |
| 5,274,918 | A | 1/1994 | Reed | 29/882 |
| 5,281,168 | A | 1/1994 | Krehbiel et al. | 435/595 |
| 5,286,212 | A | 2/1994 | Broeksteeg | |
| 5,295,843 | A | 3/1994 | Davis et al. | |
| 5,298,791 | A | 3/1994 | Liberty et al. | |
| 5,302,135 | A | 4/1994 | Lee | 439/263 |
| 5,321,582 | A | 6/1994 | Casperson | |
| 5,358,422 | A | 10/1994 | Schaffer et al. | 439/346 |
| 5,362,249 | A | 11/1994 | Carter | 439/357 |
| 5,376,012 | A | 12/1994 | Clark | 439/80 |
| 5,400,949 | A | 3/1995 | Hirvonen et al. | 228/180 |
| 5,403,206 | A | 4/1995 | McNamara et al. | 439/608 |
| 5,427,543 | A | 6/1995 | Dynia | 439/346 |
| 5,431,578 | A | 7/1995 | Wayne | 439/259 |
| 5,435,876 | A | 7/1995 | Alfaro et al. | 156/247 |
| 5,457,342 | A | 10/1995 | Herbst, II | 257/712 |
| 5,458,426 | A | 10/1995 | Ito | |
| 5,475,922 | A | 12/1995 | Tamura et al. | 29/881 |
| 5,481,442 | A | 1/1996 | Dickie et al. | 362/95 |
| 5,490,040 | A | 2/1996 | Gaudenzi et al. | 361/773 |
| 5,511,987 | A | 4/1996 | Shinchi | |
| 5,512,519 | A | 4/1996 | Hwang | |
| 5,533,915 | A | 7/1996 | Deans | 439/678 |
| 5,549,480 | A | 8/1996 | Cheng | 439/79 |
| 5,558,542 | A | 9/1996 | O'Sullivan et al. | 439/682 |
| 5,564,952 | A | 10/1996 | Davis et al. | |
| 5,582,519 | A | 12/1996 | Buchter | |
| 5,588,852 | A | 12/1996 | Puerner | 439/135 |
| 5,590,463 | A | 1/1997 | Feldman et al. | 29/844 |
| 5,605,489 | A | 2/1997 | Gale et al. | 451/28 |
| 5,609,502 | A | 3/1997 | Thumma | 439/747 |
| 5,618,187 | A | 4/1997 | Goto | 439/79 |
| 5,622,511 | A | 4/1997 | Jarrett | 439/248 |
| 5,637,008 | A | 6/1997 | Kozel | 439/342 |
| 5,643,013 | A | 7/1997 | Weidler et al. | 439/660 |
| 5,664,968 | A | 9/1997 | Mickievicz | |
| 5,667,392 | A | 9/1997 | Kocher et al. | |
| 5,691,041 | A | 11/1997 | Frankeny et al. | |
| 5,702,255 | A | 12/1997 | Murphy et al. | |
| 5,716,234 | A | 2/1998 | Phillips | 439/595 |
| 5,727,963 | A | 3/1998 | LeMaster | |
| 5,730,609 | A | 3/1998 | Harwath | 439/108 |
| 5,741,144 | A | 4/1998 | Elco et al. | 439/101 |
| 5,741,161 | A | 4/1998 | Cahaly et al. | 439/709 |
| 5,742,484 | A | 4/1998 | Gillette et al. | |

5,743,009 A 4/1998 Matsui et al.
5,745,349 A 4/1998 Lemke ..... 361/818
5,746,608 A 5/1998 Taylor ..... 439/70
5,749,746 A 5/1998 Tan et al.
5,755,595 A 5/1998 Davis et al. ..... 439/607
5,772,452 A 6/1998 Aoyama ..... 439/79
5,782,644 A 7/1998 Kiat
5,785,557 A 7/1998 Davis ..... 439/660
5,787,971 A 8/1998 Dodson ..... 165/121
5,795,191 A 8/1998 Preputnick et al. ..... 439/608
5,810,607 A 9/1998 Shih et al. ..... 439/66
5,817,973 A 10/1998 Elco et al. ..... 174/32
5,827,094 A 10/1998 Aizawa et al.
5,831,314 A 11/1998 Wen ..... 257/391
5,865,651 A 2/1999 Dague et al. ..... 439/680
5,872,046 A 2/1999 Kaeriyama et al. ..... 438/465
5,874,776 A 2/1999 Kresge et al. ..... 257/747
5,876,219 A 3/1999 Taylor et al.
5,876,248 A 3/1999 Brunker
5,879,198 A 3/1999 Sekimori et al. ..... 439/700
5,882,214 A 3/1999 Hillbish et al.
5,883,782 A 3/1999 Thurston et al. ..... 364/704
5,888,884 A 3/1999 Wojnarowski ..... 438/462
5,904,594 A 5/1999 Longueville et al. ..... 439/608
5,908,333 A 6/1999 Perino et al. ..... 439/631
5,919,050 A 7/1999 Kehley et al. ..... 439/71
5,923,995 A 7/1999 Kao et al. ..... 438/460
5,924,899 A 7/1999 Paagman ..... 439/701
5,930,114 A 7/1999 Kuzmin et al. ..... 361/704
5,937,140 A 8/1999 Leonard et al. ..... 392/392
5,955,888 A 9/1999 Frederickson et al. ..... 324/761
5,961,355 A 10/1999 Morlion et al. ..... 439/686
5,971,817 A 10/1999 Longueville ..... 439/857
5,975,921 A 11/1999 Shuey ..... 439/83
5,980,321 A 11/1999 Cohen et al. ..... 439/608
5,984,726 A 11/1999 Wu ..... 439/607
5,993,259 A 11/1999 Stokoe et al. ..... 439/608
6,012,948 A 1/2000 Wu ..... 439/567
6,027,360 A 2/2000 Jenkins ..... 439/364
6,036,549 A 3/2000 Wulff
6,041,498 A 3/2000 Hillbish et al.
6,050,862 A 4/2000 Ishii ..... 439/843
6,059,170 A 5/2000 Jimarez et al. ..... 228/119
6,062,911 A 5/2000 Davis et al. ..... 439/630
6,063,696 A 5/2000 Brenner et al. ..... 438/465
6,066,048 A 5/2000 Lees
6,068,520 A 5/2000 Winings et al. ..... 439/676
6,071,152 A 6/2000 Achammer et al. ..... 439/733.1
6,089,878 A 7/2000 Meng ..... 439/79
6,095,827 A 8/2000 Dutkowsky et al. ..... 439/83
6,123,554 A 9/2000 Ortega et al. ..... 439/79
6,125,535 A 10/2000 Chiou et al. ..... 29/883
6,139,336 A 10/2000 Olson ..... 439/83
6,146,157 A 11/2000 Lenoir et al. ..... 439/101
6,146,202 A 11/2000 Ramey et al. ..... 439/608
6,146,203 A 11/2000 Elco et al. ..... 439/608
6,152,756 A 11/2000 Huang et al. ..... 439/342
6,174,198 B1 1/2001 Wu et al. ..... 439/541.5
6,178,106 B1 1/2001 Umemoto et al. ..... 363/146
6,180,891 B1 1/2001 Murdeshwar ..... 174/260
6,183,301 B1 2/2001 Paagman ..... 439/608
6,190,213 B1 2/2001 Reichart et al. ..... 439/736
6,190,215 B1 2/2001 Pendleton et al. ..... 439/853
6,196,871 B1 3/2001 Szu ..... 439/571
6,202,916 B1 3/2001 Updike et al.
6,206,722 B1 3/2001 Ko et al.
6,210,197 B1 4/2001 Yu
6,212,755 B1 4/2001 Shimada et al. ..... 29/527.1
6,215,180 B1 4/2001 Chen et al.
6,219,913 B1 4/2001 Uchiyama ..... 29/883
6,220,884 B1 4/2001 Lin
6,220,895 B1 4/2001 Lin
6,220,896 B1 4/2001 Bertoncini et al. ..... 439/608
6,238,225 B1 5/2001 Middlehurst et al.
6,257,478 B1 7/2001 Straub
6,259,039 B1 7/2001 Chroneos, Jr. et al.
6,261,132 B1 7/2001 Koseki et al.
6,269,539 B1 8/2001 Takahashi et al. ..... 29/883
6,272,474 B1 8/2001 Garcia
6,280,230 B1 8/2001 Takase et al.
6,293,827 B1 9/2001 Stokoe ..... 439/608
6,299,492 B1 10/2001 Pierini et al.
6,319,075 B1 11/2001 Clark et al. ..... 439/825
6,322,377 B2 11/2001 Middlehurst et al.
6,328,602 B1 12/2001 Yamasaki et al. ..... 439/608
6,335,224 B1 1/2002 Peterson et al. ..... 438/114
6,347,952 B1 2/2002 Hasegawa et al.
6,350,134 B1 2/2002 Fogg et al. ..... 439/79
6,358,094 B1 3/2002 Belopolsky et al. ..... 439/637
6,359,783 B1 3/2002 Noble
6,360,940 B1 3/2002 Bolde et al. ..... 228/264
6,362,961 B1 3/2002 Chiou ..... 361/704
6,363,607 B1 4/2002 Chen et al. ..... 29/883
6,371,773 B1 4/2002 Crofoot et al. ..... 439/79
6,379,188 B1 4/2002 Cohen et al. ..... 439/608
6,386,924 B2 5/2002 Long ..... 439/701
6,394,818 B1 5/2002 Smalley, Jr.
6,402,566 B1 6/2002 Middlehurst et al.
6,409,543 B1 6/2002 Astbury, Jr. et al. ..... 439/608
6,431,914 B1 8/2002 Billman ..... 439/608
6,435,914 B1 8/2002 Billman ..... 439/608
6,450,029 B1 9/2002 Sakai et al.
6,461,183 B1 10/2002 Ohkita et al.
6,461,202 B2 10/2002 Kline ..... 439/701
6,471,523 B1 10/2002 Shuey ..... 439/63
6,471,548 B2 10/2002 Bertoncini et al. ..... 439/608
6,472,474 B2 10/2002 Burkhardt et al.
6,488,549 B1 12/2002 Weller et al.
6,489,567 B2 12/2002 Zachrai
6,506,081 B2 1/2003 Blanchfield et al. ..... 439/682
6,511,329 B2 1/2003 Yi-Tsung ..... 439/76.1
6,514,103 B2 2/2003 Pape et al.
6,537,111 B2 3/2003 Brammer et al. ..... 439/857
6,551,112 B1 4/2003 Li et al. ..... 439/66
6,554,046 B1 4/2003 Bryan et al. ..... 156/584
6,554,647 B1 4/2003 Cohen et al. ..... 439/607
6,572,410 B1 6/2003 Volstorf et al. ..... 439/608
6,575,774 B2 6/2003 Ling et al.
6,575,776 B1 6/2003 Conner et al.
6,592,381 B2 7/2003 Cohen et al. ..... 439/80
6,604,967 B2 8/2003 Middlehurst et al.
6,629,854 B2 10/2003 Murakami
6,652,318 B1 11/2003 Winings et al. ..... 439/608
6,663,426 B2 12/2003 Hasireoglu et al. ..... 439/608
6,665,189 B1 12/2003 Lebo ..... 361/730
6,669,514 B2 12/2003 Wiebking et al. ..... 439/701
6,672,884 B1 1/2004 Toh et al.
6,672,907 B2 1/2004 Azuma ..... 439/682
6,692,272 B2 2/2004 Lemke et al. ..... 439/108
6,702,594 B2 3/2004 Lee et al. ..... 439/83
6,705,902 B1 3/2004 Yi et al. ..... 439/678
6,712,621 B2 3/2004 Li et al. ..... 439/65
6,716,068 B2 4/2004 Wu ..... 439/733.1
6,740,820 B2 5/2004 Cheng ..... 174/260
6,743,037 B2 6/2004 Kassa et al. ..... 439/342
6,746,278 B2 6/2004 Nelson et al. ..... 439/608
6,769,935 B2 8/2004 Stokoe et al.
6,776,635 B2 8/2004 Blanchfield et al. ..... 439/181
6,776,649 B2 8/2004 Pape et al. ..... 439/485
6,780,027 B2 8/2004 Allison
6,790,088 B2 9/2004 Ono et al. ..... 439/607
6,796,831 B1 9/2004 Yasufuku et al. ..... 439/485

| | | | | |
|---|---|---|---|---|
| 6,810,783 | B1 | 11/2004 | Larose | |
| 6,811,440 | B1 | 11/2004 | Rothermel et al. | 439/608 |
| 6,814,590 | B2 | 11/2004 | Minich et al. | |
| 6,829,143 | B2 | 12/2004 | Russell et al. | 361/704 |
| 6,835,103 | B2 | 12/2004 | Middlehurst et al. | 439/699.1 |
| 6,843,687 | B2 | 1/2005 | McGowan et al. | 439/608 |
| 6,848,886 | B2 | 2/2005 | Schmaling et al. | 416/134 |
| 6,848,950 | B2 | 2/2005 | Allison et al. | 439/682 |
| 6,869,294 | B2 | 3/2005 | Clark et al. | |
| 6,884,117 | B2 | 4/2005 | Korsunsky et al. | 439/607 |
| 6,890,221 | B2 | 5/2005 | Wagner | 439/855 |
| 6,905,367 | B2 | 6/2005 | Crane, Jr. et al. | 439/608 |
| 6,947,012 | B2 | 9/2005 | Aisenbrey | 343/906 |
| 6,975,511 | B1 | 12/2005 | Lebo et al. | 361/703 |
| 6,994,569 | B2 | 2/2006 | Minich et al. | 439/79 |
| 7,001,189 | B1 | 2/2006 | McGowan et al. | 439/79 |
| 7,059,892 | B1 | 6/2006 | Trout | |
| 7,059,919 | B2 | 6/2006 | Clark et al. | |
| 7,065,871 | B2 | 6/2006 | Minich et al. | |
| 7,070,464 | B2 | 7/2006 | Clark et al. | |
| 7,097,465 | B1 | 8/2006 | Korsunsky et al. | |
| 7,101,228 | B2 | 9/2006 | Hamner et al. | 439/637 |
| 7,104,812 | B1 | 9/2006 | Bogiel et al. | 439/79 |
| 7,114,963 | B2 | 10/2006 | Shuey et al. | 439/79 |
| RE39,380 | E | 11/2006 | Davis | |
| 7,137,848 | B1 | 11/2006 | Trout et al. | |
| 7,168,963 | B2 | 1/2007 | Minich et al. | 439/79 |
| 7,182,642 | B2 | 2/2007 | Ngo et al. | 439/608 |
| 7,204,699 | B2 | 4/2007 | Stoner | |
| D542,736 | S | 5/2007 | Rico | D13/147 |
| 7,220,141 | B2 | 5/2007 | Daily et al. | |
| 7,258,562 | B2 | 8/2007 | Daily et al. | |
| 7,273,382 | B2 | 9/2007 | Igarashi et al. | |
| 7,303,427 | B2 | 12/2007 | Swain | |
| 7,335,043 | B2 | 2/2008 | Hgo et al. | |
| 7,384,289 | B2 | 6/2008 | Minich | |
| 7,425,145 | B2 | 9/2008 | Ngo | |
| 7,458,839 | B2 | 12/2008 | Ngo | |
| 7,476,108 | B2 | 5/2009 | Swain et al. | |
| 2001/0000498 | A1 | 4/2001 | Watanabe et al. | 439/507 |
| 2001/0003685 | A1 | 6/2001 | Aritani | 439/485 |
| 2001/0049229 | A1 | 12/2001 | Pape et al. | |
| 2002/0106930 | A1 | 8/2002 | Pape et al. | 439/485 |
| 2002/0142676 | A1 | 10/2002 | Hosaka et al. | 439/874 |
| 2002/0159235 | A1 | 10/2002 | Miller et al. | 361/704 |
| 2002/0193019 | A1 | 12/2002 | Blanchfield et al. | 439/857 |
| 2003/0013330 | A1 | 1/2003 | Takeuchi | 439/83 |
| 2003/0119378 | A1 | 6/2003 | Avery | |
| 2003/0143894 | A1 | 7/2003 | Kline et al. | 439/608 |
| 2003/0219999 | A1 | 11/2003 | Minich et al. | 439/79 |
| 2003/0220021 | A1 | 11/2003 | Whiteman, Jr. et al. | 439/608 |
| 2003/0236035 | A1 | 12/2003 | Kuroda et al. | 439/857 |
| 2004/0147177 | A1 | 7/2004 | Wagner | |
| 2004/0183094 | A1 | 9/2004 | Caletka et al. | 257/178 |
| 2005/0112952 | A1 | 5/2005 | Wang et al. | 439/660 |
| 2006/0003620 | A1 | 1/2006 | Daily et al. | 439/295 |
| 2006/0128197 | A1 | 6/2006 | McGowan et al. | |
| 2006/0228927 | A1 | 10/2006 | Daily | |
| 2006/0228948 | A1 | 10/2006 | Swain | |
| 2006/0281354 | A1 | 12/2006 | Ngo et al. | 439/290 |
| 2007/0197063 | A1 | 8/2007 | Ngo | |
| 2007/0202748 | A1 | 8/2007 | Daily | |
| 2007/0275586 | A1 | 11/2007 | Hgo | |
| 2007/0293084 | A1 | 12/2007 | Ngo | |
| 2008/0038956 | A1 | 2/2008 | Swain | |
| 2008/0248670 | A1 | 10/2008 | Daily et al. | |

OTHER PUBLICATIONS

Power TwinBlade™ I/O Cable Connector RA–North–South, No. GS–20_072, Aug. 6, 2007, 11 pages.

Product Datasheets, 10 Bgit/s XENPAK 850 nm Transponder (TRP10GVP2045), Copyright 2005, MergeOptics GmbH, 13 pages.

Product Datasheets, Welome to XENPAK.org., Copyright 2001, http://www.xenpak.org., 1 page.

FCI, "PwrBlade® Power Distribution Connector System," 2003, www.fciconnect.com, 2 pages.

FCI, "PwrBlade® Power Distribution Connector System," *Technology Innovation Service,* 2003, 2–3.

FCI, "PwrBlade™, new Power Distribution connector for electronic applications," *Product News,* 2003, www.fciconnect.com, 1 page.

FCI, "Act Connectors in action," *Panorama,* 2003, 1 page.

In the United States Patent and Trademark Office, Notice of Allowance and Fee(s) Due in re: U.S. Appl. No. 10/352,584, filed Jan. 28, 2003, 4 pages.

In the United States Patent and Trademark Office, Office Action Final Rejection in re: U.S. Appl. No. 10/352,584, filed Jan. 28, 2003, 7 pages.

In the United States Patent and Trademark Office, Non Final Office Action in re: U.S. Appl. No. 10/352,584, filed Jan. 28, 2003, 14 pages.

Finan, J.M., "Thermally Conductive Thermoplastics", LNP Engineering Plastics, Inc., Plastics Engineering 2000, www.4spe.org, 4 pages.

Sherman, L.M., "Plastics that Conduct Heat", Plastics Technology Online, Jun. 2001, http://www.plasticstechnology.com, 4 pages.

Ogando, J., "And now—An Injection–Molded Heat Exchanger", Sure, plastics are thermal insulators, but additive packages allow them to conduct heat instead, Global Design News, Nov. 1, 2000, 4 pages.

U.S. Appl. No. 09/944,266, filed Aug. 31, 2001, Schell.

POWER CONNECTOR WITH SAFETY FEATURE

Matter enclosed in heavy brackets [ ] appears in the original patent but forms no part of this reissue specification; matter printed in italics indicates the additions made by reissue.

CROSS-REFERENCE TO RELATED APPLICATION

This is a continuation of U.S. patent application Ser. No. 10/352,531 filed Jan. 28, 2003, now abandoned the contents of which is incorporated by reference herein in its entirety.

FIELD OF THE INVENTION

The present invention relates to electrical power connectors that are useful in circuit board or backplane interconnection systems. Connectors of the present invention include a safety feature that restricts access to hot AC power contacts housed within the connectors.

BACKGROUND OF THE INVENTION

There has been significant evolution in the area of electrical connectors, with improvements including multi-function consolidation within a single connector housing, and employment of features for effective heat dissipation generated from electrical power transmission. For example, Clark et al., in U.S. Pat. No. 6,319,075, discloses an electrical connector including both power and signal contacts within a single insulative housing, thereby eliminating the need for two separate connectors. Preferred power contacts disclosed in the '075 patent employ a "dual-mass" principle that provides a greater surface area available for heat dissipation, as compared to "single-mass" designed contacts, such as, for example, those having a circular or pin-like cross section.

Electrical connectors similar to those above may further comprise an AC power cable port and AC power contacts for direct connection with an external power supply. Examples of such connectors are commercially available from FCI Electronics, Inc. FCI's PWRBLADE brand connector series includes a receptacle connector that consists of AC power contacts, DC power contacts, signal contacts, and a shrouded AC cable port. Each of the power contacts includes two contact walls with a space therebetween to facilitate heat dissipation. Two patent applications owned by the assignee of the instant application and generally related to power distribution connectors, U.S. patent application Ser. No. 09/160,900 filed Sep. 25, 1998 and Ser. No. 09/944,266 filed Aug. 31, 2001, are currently pending in the U.S. Patent & Trademark Office, and are incorporated by reference herein.

Power distribution connectors that are engaged with an AC power cable plug when the mating face is unconnected to a complementary connector, may provide access of foreign objects to engaging portions of the hot AC power contacts. Accordingly, there is room for improvement in the art.

SUMMARY OF THE PRESENT INVENTION

The present invention is related to electrical connectors having contacts for transmitting electrical power and electrical signals in a single connector. In accordance with a preferred embodiment of the present invention, there has now been provided an electrical connector comprising an insulative housing including a connector mating face, and an AC power contact disposed in the insulative housing. The connector mating face comprises an aperture to provide access to an engaging portion of the AC power contact, and a guard for preventing direct human touching of the engaging portion.

In accordance with another preferred embodiment of the present invention, there has now been provided an electrical connector comprising an insulative housing, and an AC power contact disposed in the insulative housing. The power contact includes an engaging portion comprising two spaced apart contact walls. The insulative housing includes a mating face having an aperture therein to provide access to the AC power contact, and a guard proximate a perimeter of the aperture to define an electrical shock safety gap of at least about 5 mm between a human digit that is directed towards the aperture and the engaging portion of the AC power contact.

In accordance with yet another preferred embodiment of the present invention, there has now been provided an electrical connector comprising an insulative housing having a mating face, a plurality of AC power contacts, a plurality of DC power contacts, and a plurality of signal contacts. The mating face comprises a plurality of spaced apart apertures to provide access to a mating portion of a power or signal contact, and at least one outwardly directed projection extending along at least a portion of a perimeter defined by each of the apertures corresponding to the plurality of AC power contacts.

These and various other features of novelty, and their respective advantages, are pointed out with particularity in the claims annexed hereto and forming a part hereof. However, for a better understanding of aspects of the invention, reference should be made to the drawings which form a further part hereof, and to the accompanying descriptive matter, in which there is illustrated preferred embodiments.

DETAILED DESCRIPTION OF THE PREFERRED EMBODIMENTS

Figure 1:
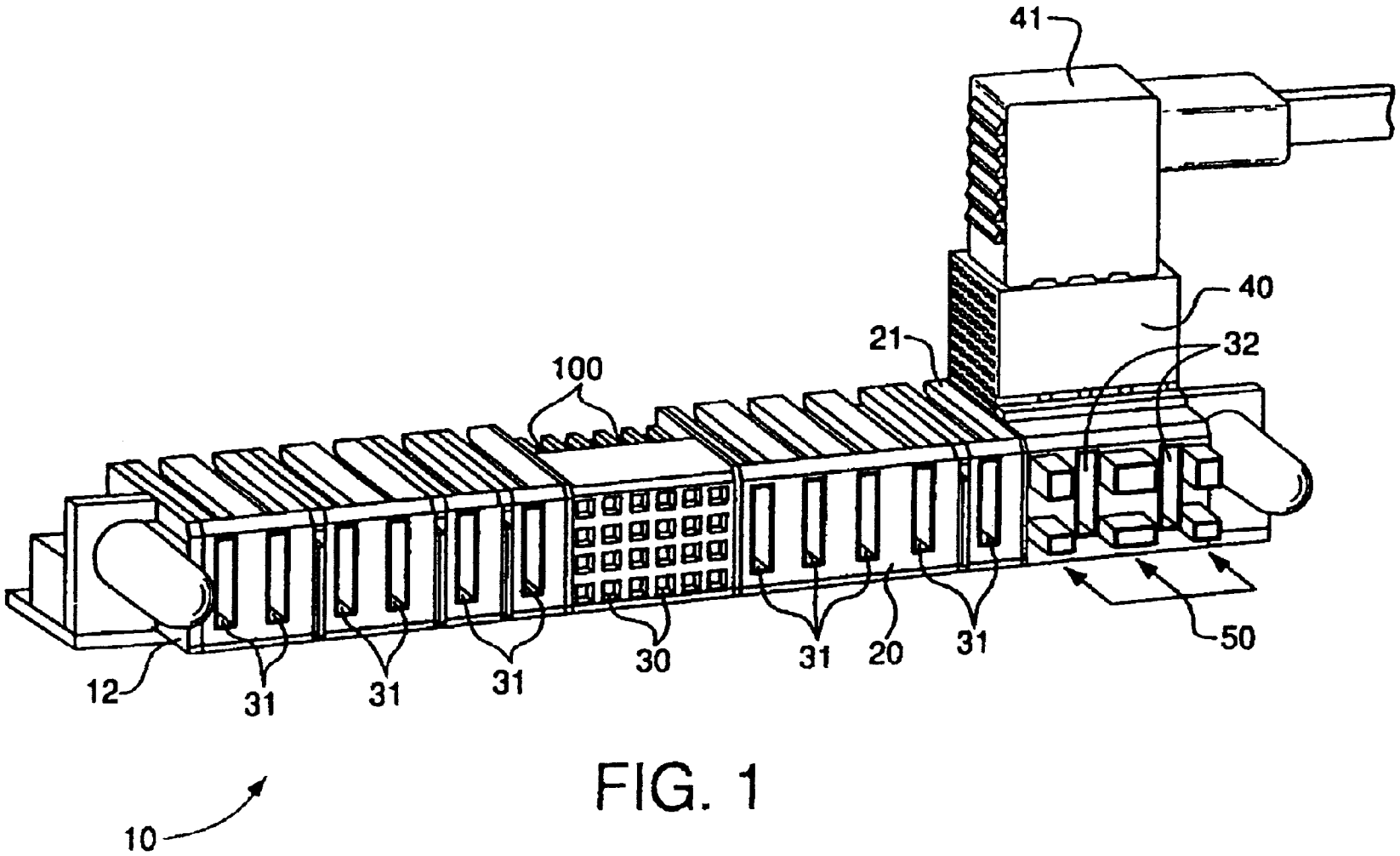
FIG. 1 is a perspective view of an electrical connector embodiment provided by the present invention including anti-shock guard projections extending from its mating face.

The present invention is believed to be best understood through the following detailed description of preferred embodiments and the accompanying drawings wherein like reference numbers indicate like features. Referring to FIG. 1, an electrical receptacle connector 10 is shown including an insulative housing 12 having a mating face 20 for receiving a complimentary header connector (not shown). Mating face 20 contains a plurality of apertures that provide access to electrical contacts disposed in insulative housing 12. Apertures 30 provide access to engaging portions of signal contacts 100, apertures 31 provide access to engaging portions of DC power contacts 80 (shown in FIG. 7), and apertures 32 provide access to engaging portions of AC power contacts 70 (shown in FIG. 6). Although the number and arrangement of the various apertures is identical in all of the figures herein, connectors covered by the appended claims may have any number of contacts and corresponding apertures that are arranged in various configurations.

A shrouded AC cable port 40 extends from a top portion 21 of housing 12. An external power supply is provided by way of an AC power cable plug 41, which is shown partially inserted within AC cable port 40. Preferred connectors may alternatively be configured so that AC cable port 40 extends from a bottom portion or rear portion of housing 12. AC power cable plug 41 engages vertically-oriented AC power contacts 70 (shown in FIG. 6). An anti-shock guard 50 is employed to restrict direct operator access (that is, direct human touching without the aid of a tool) to the hot AC power contacts 70 during times when AC power cable plug 41 is engaged and receptacle connector 10 is disconnected from a complementary header connector.

Figure 2:
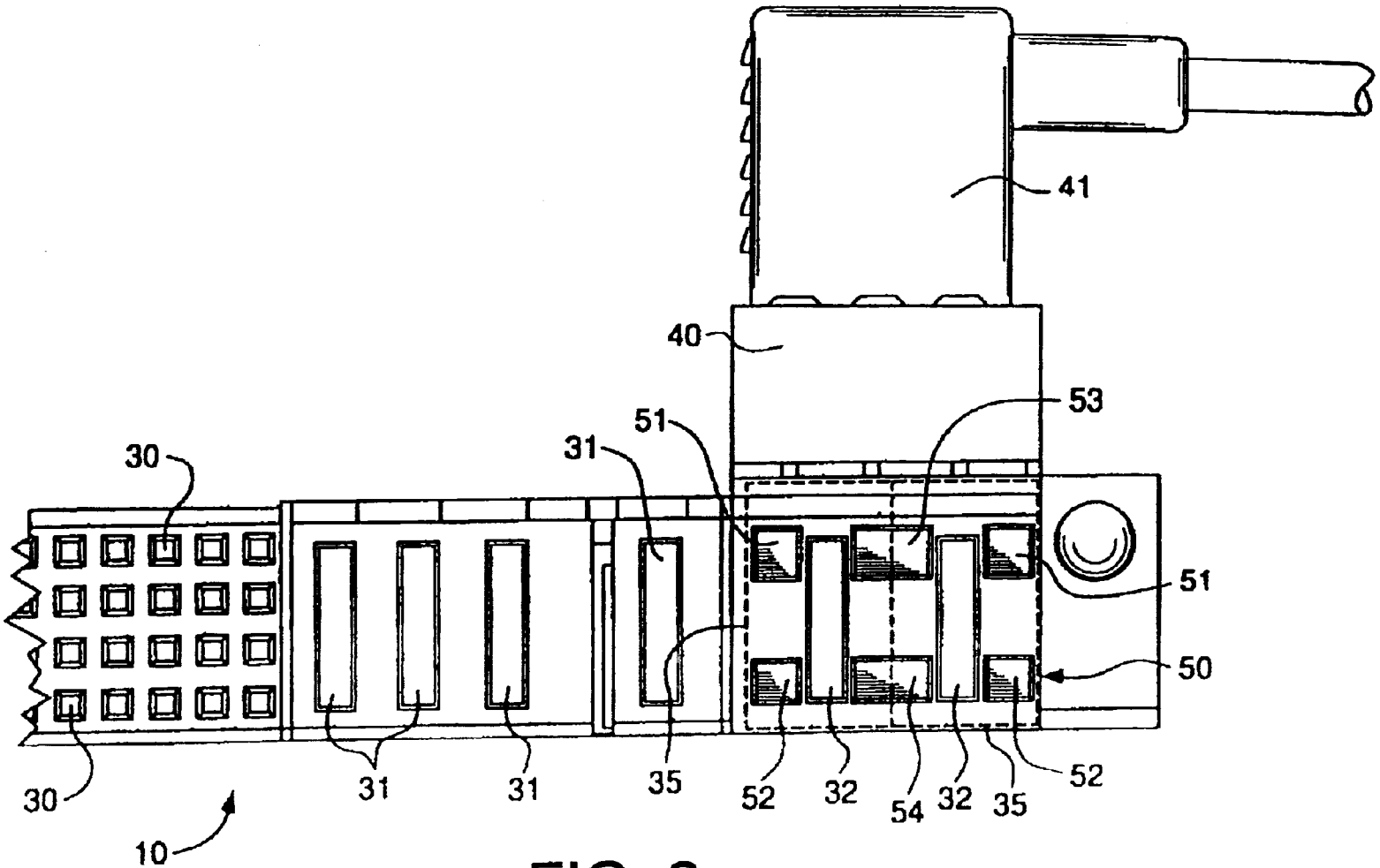
FIG. 2 is a partial front view of the electrical connector embodiment shown in FIG. 1.
Figure 3:
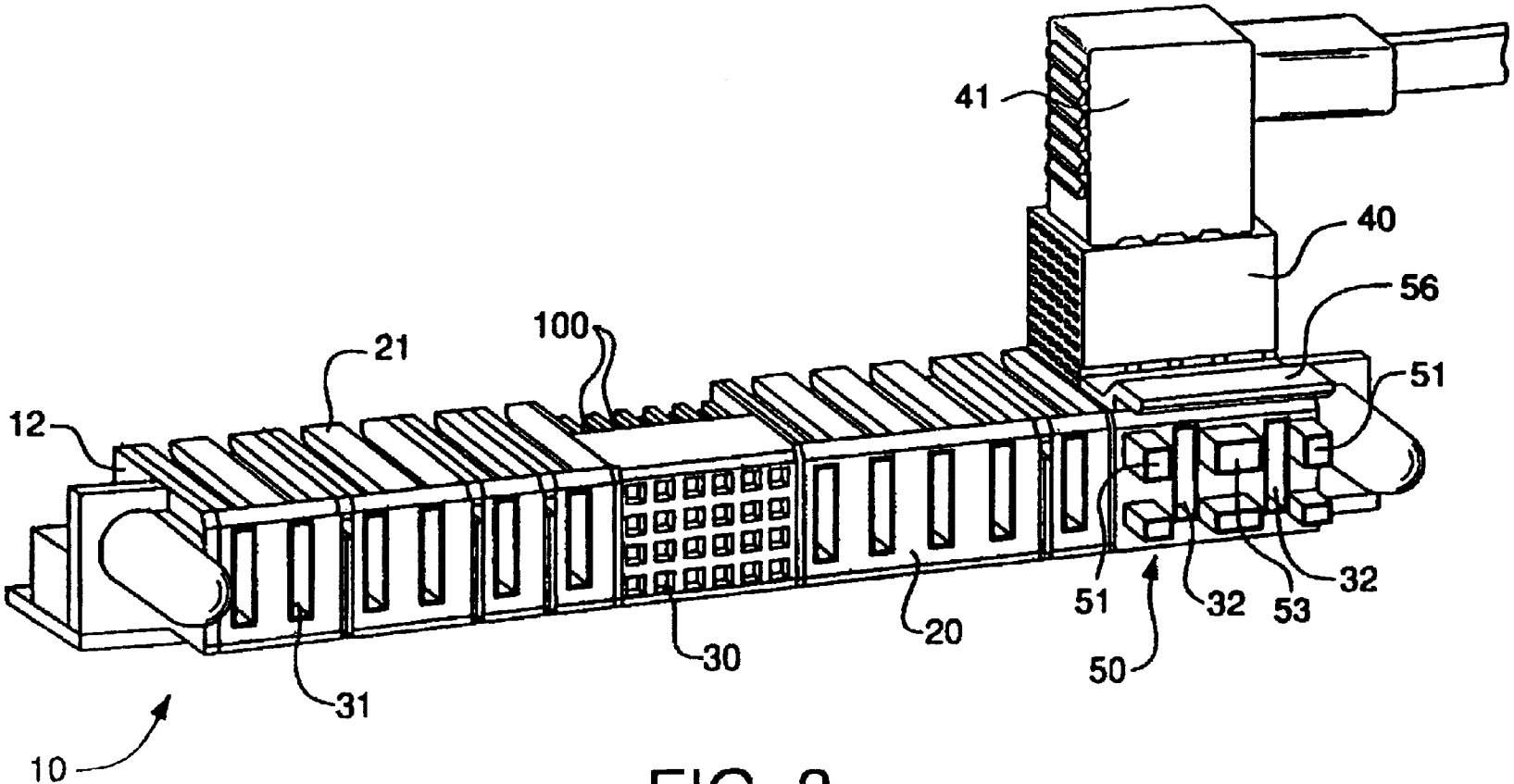
FIG. 3 is a perspective view of another electrical connector embodiment provided by the present invention including beam and hood projections extending from its mating face.
Figure 4:
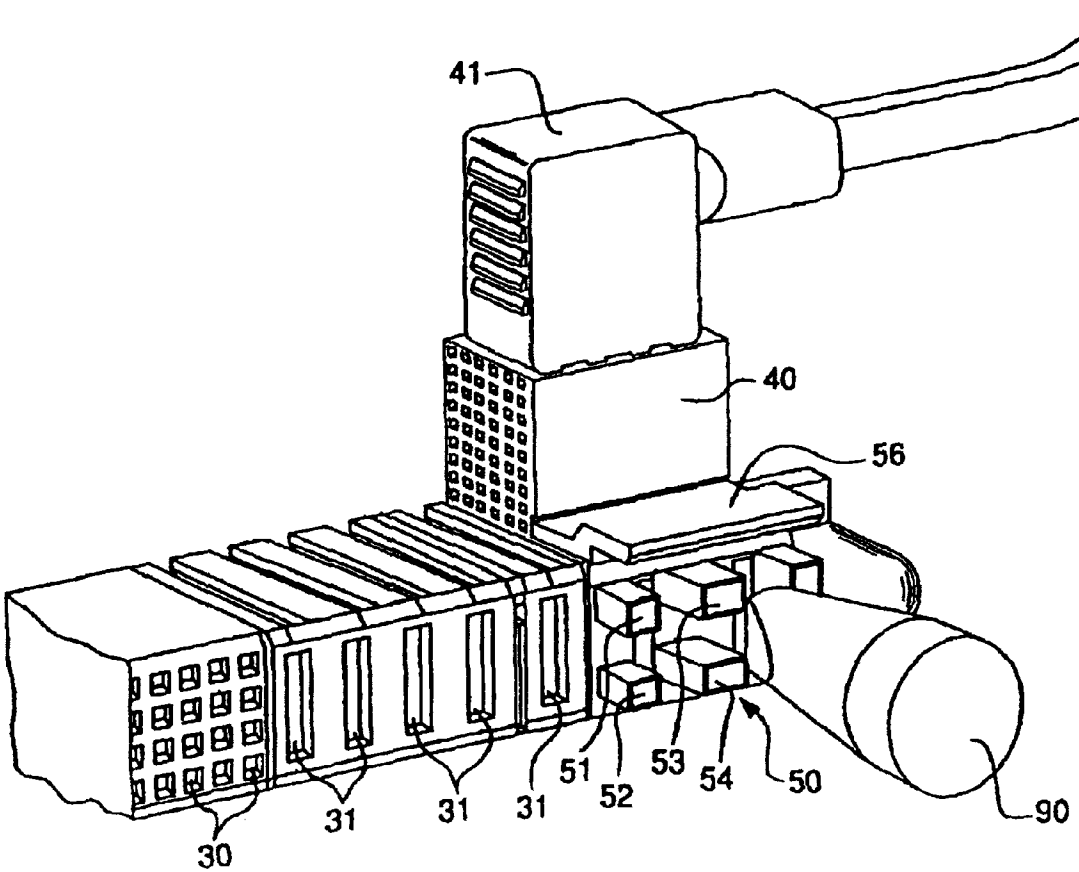
FIG. 4 is a partial perspective view of the electrical connector embodiment shown in FIG. 3, and including a simulated human digit directed towards an aperture providing access to an AC power contact.

Preferred exemplary embodiments of anti-shock guard 50 will be described with reference to FIGS. 2–5. Mating face 20 includes a perimeter area 35 associated with each of apertures 32 that provide access to AC power contacts 70. Perimeter area 35 is shown as a dotted line in FIG. 2; however, the perimeter area as included in the preferred embodiments and appended claims should not be construed as a fixed area limited to contact with or within a certain distance of apertures 32, but rather is the area generally surrounding apertures 32. Anti-shock guard 50 may comprise one or more projections extending outwardly along at least a portion of perimeter area 35. By way of example and as shown in FIGS. 2–4, two spaced apart beams 51 and 52 are disposed on one side of perimeter area 35 and two additional spaced apart beams 53 and 54 are disposed on the opposing side. A space exists between each pair of beams 51, 52 and 53, 54 to provide room for structural features employed on a complementary header connector. The space may for example, support and insulate electrical contacts extending from the header connector, or provide a latching feature. Alternative embodiments (not shown) contemplated and covered by the appended claims include, but are not limited to, a single projection disposed on opposing sides of perimeter area 35, and a single projection extending along a sufficient portion of perimeter area 35 to encompass opposing sides thereof. Connector 10 is shown having two apertures 32, with beams 53 and 54 serving as joint anti-shock guard projections on one side of the adjacent perimeter areas 35 of the two apertures. Individual, side-by-side beams could alternatively be employed that extend from the adjacent perimeter areas. Since beams 53 and 54 collectively restrict operator access to two adjacent apertures, they are preferably slightly larger than beams 51 and 52.

Now referring to FIG. 3, another projection in the form of a hood 56 preferably extends from a top position of perimeter area 35 and in between opposing beams 51 and 53. Hood 56 restricts operator access to apertures 32 from a position above connector 10. Hood 56 is shown as a single projection extending over two adjacent apertures 32; however, hood 56 could alternatively comprise multiple individual projections associated with the individual apertures. As illustrated by comparing FIGS. 1 and 3, preferred connectors may include an anti-shock guard 50 having one type of projection discussed above (beam and hood) and not the other.

Figure 5:
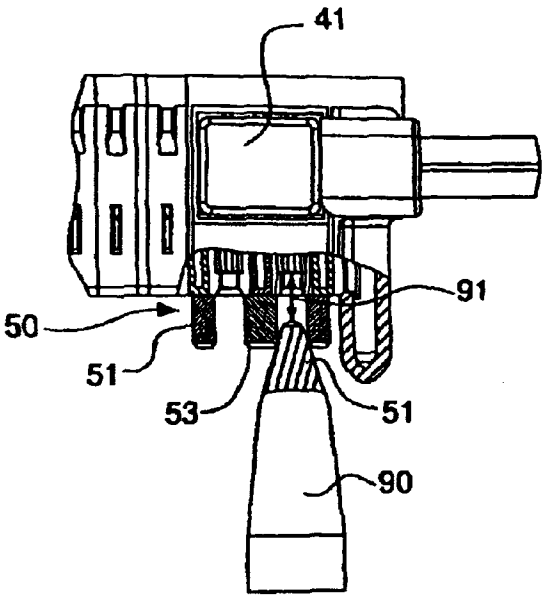
FIG. 5 is a partial cutaway view of the electrical connector embodiment shown in FIG. 3, illustrating a safety gap between a simulated human digit and a power contact housed with the connector.

As can be seen in FIGS. 4 and 5, a simulated human digit 90 directed towards an aperture 32 is restricted from touching the hot AC power contact 70 accessible via aperture 32. A safety gap 91 of at least 5 mm is provided between simulated human digit 90 and an engaging portion of the AC power contact.

Housing 12, AC cable port 40, and anti-shock guard 50 are preferably molded or formed from a glass-filled high temperature nylon or other materials known to one having ordinary skill in the art. AC cable port 40 and anti-shock guard 50 may be integrally molded with housing 12, or alternatively, be manufactured separately and then coupled to housing 12.

Figure 6:
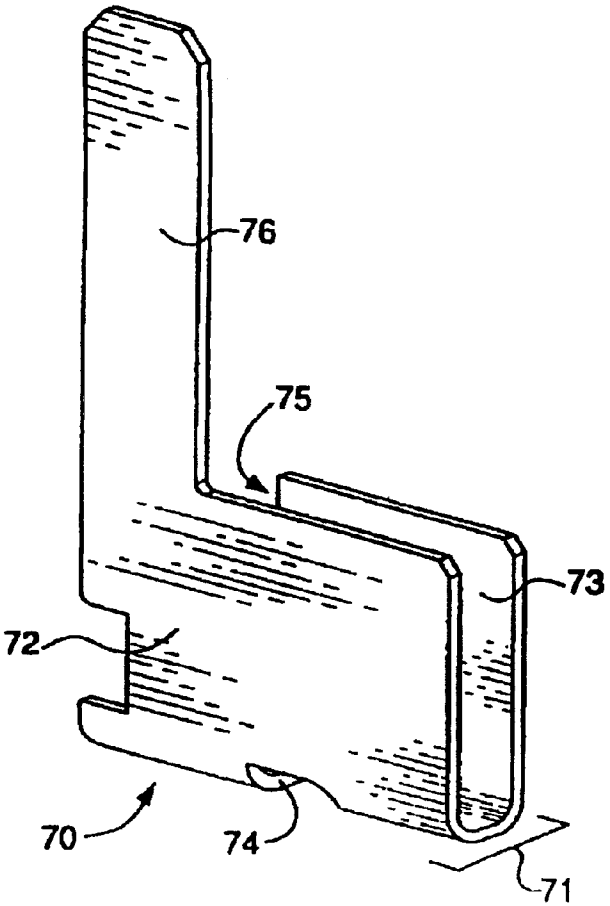
FIG. 6 is a perspective view of an AC power contact embodiment comprising two spaced apart contact walls and a tab extending from one of the contact walls.

Power circuits can undergo changes in electrical properties because of the relatively high current flows, for example, on the order of 30 amps or more in certain electronic equipment. Preferred power contacts are designed to dissipate heat generated from power transmission so that changes in circuit characteristics are minimized. A preferred AC power contact 70 is shown in FIG. 6, comprising an engaging portion 71 having two spaced apart contact walls 72 and 73 connected by a bridging element 74. Employing two contact walls increases the electrical integrity of the connector. Also, the two contact walls in conjunction with intermediate space 75 increases the ability and rate of heat dissipation. A tab 76 extends from contact wall 72 for engaging AC power cable plug 41. Although not shown, both contact walls 72 and 73 may include a tab for engaging an external power supply.

Figure 7:
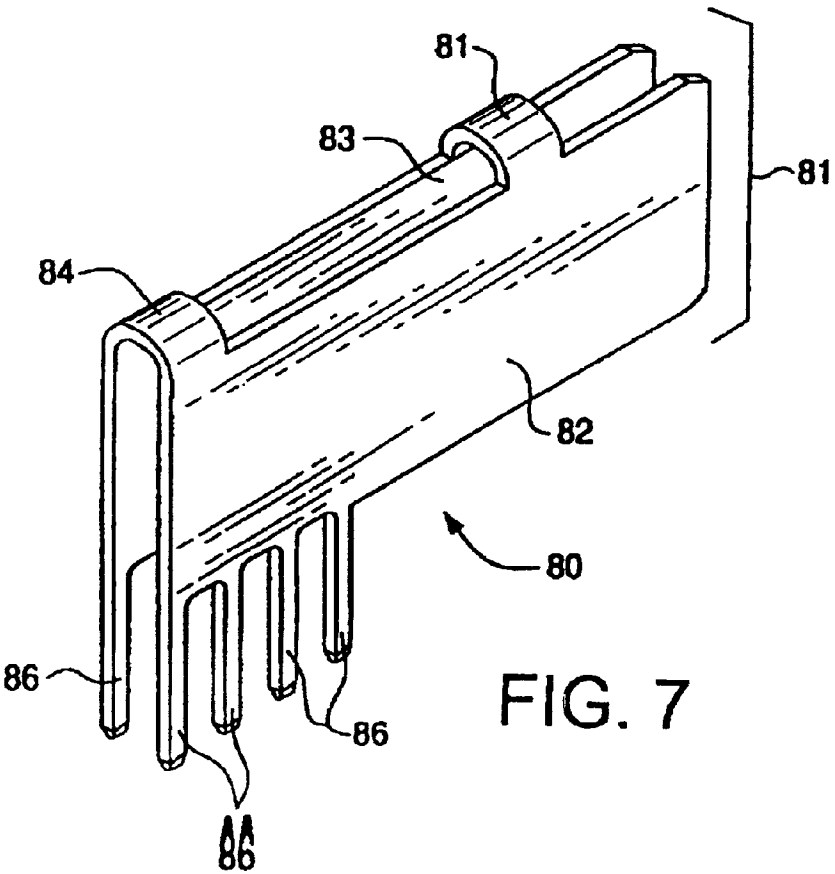
FIG. 7 is a perspective view of a DC power contact embodiment comprising two spaced apart contact walls and a plurality of terminals extending from each of the contact walls.

Referring now to FIG. 7, a preferred DC power contact 80 is shown, similar to the preferred AC power contact 70, comprising an engaging portion 81 having two spaced apart contact walls 82 and 83 connected by a bridging element 84. One or both, as shown in FIG. 7, of contact walls 82 and 83 have terminals 86 for connection with a circuit board (not shown).

Power contacts 70 and 80 are preferably loaded into housing 12 from the rear. The contact walls and/or bridging element of the AC and DC power contacts 70, 80 may contain notches or other female elements, and/or tangs or other male elements for retaining the power contacts in housing 12. Preferred power contacts 70 and 80 are stamped or otherwise formed as single piece from suitable materials such as phosphor bronze alloys or beryllium copper alloys. Signal contacts 100 (shown in FIG. 1 disposed in housing 12) are preferably "pin-type" contacts that include tail portions for connection with a circuit board, and are made from suitable materials, such as, for example, copper alloys. The power and signal contacts may be plated with gold, or a combination of gold and nickel.

It is to be understood that even though numerous characteristics and advantages of the present invention have been set forth in the foregoing description, together with details of the structure and function of the invention, the disclosure is illustrative only. Accordingly, changes may be made in detail, especially in matters of shape, size and arrangement of features within the principles of the invention to the full extent indicated by the broad general meaning of the terms in which the appended claims are expressed.

What is claimed is:

1. An electrical connector, comprising:

an insulative housing including a connector mating face;

a DC power contact disposed in said insulative housing, said DC power contact comprising a pair of opposed and spaced apart contact walls, and one or more terminals extending from one of the contact walls for engaging a circuit board;

an AC power contact disposed in said insulative housing; and a shrouded AC cable port extending from said insulative housing at a location that is different from that of said connector mating face;

wherein said connector mating face comprises:

an aperture therein to provide access to a engaging portion of said AC power contact;

a perimeter area adjacent said aperture; and a guard proximate said perimeter area for preventing direct human touching of said engaging portion of said AC power contact.

2. The electrical connector according to claim 1, wherein said AC power contact comprises a pair of opposed and spaced apart contact walls, and a tab extending from at least one of the contact walls.

3. The electrical connector according to claim 1, further comprising a plurality of signal contacts disposed in said insulative housing.

4. The electrical connector according to claim 1, wherein said guard comprises at least one projection extending outwardly from opposing sides of said perimeter area.

5. The electrical connector according to claim 4, wherein said guard comprises two spaced apart projections extending outwardly from each of the opposing sides of said perimeter area.

6. The electrical connector according to claim [3] *5*, wherein said two spaced apart projections are dissimilar.

7. An electrical connector, comprising:

an insulative housing including a connector mating face including first and second apertures formed therein;

a first type of power contact disposed in said insulative housing and accessible through said first aperture;

a second type of power contact disposed in said insulative housing, said second type of power contact being accessible through said second aperture and having a different configuration than that of said first type of power contact; and at least one projection extending outwardly from said connector mating face and along at least a portion of a perimeter of said first aperture to inhibit entry of a human digit into said first aperture, wherein said first type of power contact comprises a pair of opposed and spaced apart walls, at least one of which includes a tab for engaging an AC power cable plug; and wherein said second type of power contact comprises a second pair of opposed and spaced apart walls including a plurality of terminals extending therefrom for engaging a printed circuit board.

* * * * *